(12) United States Patent
Neugebauer et al.

(10) Patent No.: US 6,571,822 B2
(45) Date of Patent: Jun. 3, 2003

(54) LOW BLOW DOWN RELIEF VALVE

(75) Inventors: Thomas W. Neugebauer, Houston, TX (US); Richard R. Watson, Missouri City, TX (US)

(73) Assignee: Gilmore Valve Co., Ltd., Houston, TX (US)

(*) Notice: Subject to any disclaimer, the term of this patent is extended or adjusted under 35 U.S.C. 154(b) by 99 days.

(21) Appl. No.: 09/923,866

(22) Filed: Aug. 6, 2001

(65) Prior Publication Data

US 2003/0029504 A1 Feb. 13, 2003

(51) Int. Cl.[7] .............................................. F16K 15/02
(52) U.S. Cl. ....................... 137/538; 137/540; 251/334; 277/589
(58) Field of Search ........................ 137/533.19, 538, 137/540; 251/334; 277/587, 589, 638, 910

(56) References Cited

U.S. PATENT DOCUMENTS

| | | | |
|---|---|---|---|
| 3,006,364 A | * | 10/1961 | Osborn ....................... 137/538 |
| 3,132,869 A | | 5/1964 | Campbell |
| 3,232,314 A | | 2/1966 | Koester |
| 3,712,332 A | * | 1/1973 | Galbraith et al. ........... 137/495 |
| 3,770,008 A | | 11/1973 | Turney |
| 4,046,157 A | * | 9/1977 | Cazalaa et al. ............... 137/74 |
| 4,284,101 A | | 8/1981 | Weirich |
| 4,313,463 A | | 2/1982 | Weirich |
| 4,456,028 A | | 6/1984 | Watson |
| 4,530,373 A | | 7/1985 | Bork, Jr. et al. |
| 4,531,542 A | | 7/1985 | Looney |
| 4,566,486 A | | 1/1986 | Taylor et al. |
| 4,712,576 A | | 12/1987 | Ariizumi et al. |
| 4,727,902 A | | 3/1988 | Unterstein et al. |
| 4,790,348 A | | 12/1988 | Gausman et al. |
| 5,168,895 A | | 12/1992 | Voss |
| 5,400,817 A | | 3/1995 | Voss et al. |
| 5,644,930 A | * | 7/1997 | Albertson et al. ............ 62/475 |

OTHER PUBLICATIONS

Gilmore Valve Company brochure—Hydraulic Relief Valves.

* cited by examiner

Primary Examiner—Michael Powell Buiz
Assistant Examiner—Ramesh Krishnamurthy
(74) Attorney, Agent, or Firm—Blackwell Sanders Peper Martin LLP

(57) ABSTRACT

A relief valve having blow down values of 5% or lower is disclosed. The low blow down values are the result of reducing friction within the relief valve. The relief valve includes a movable plunger. Clearance is provided whereby the plunger does not experience significant friction as it moves into sealing contact with the seal assembly. An energized seal assembly forms a tight seal against the plunger while creating little friction, as the seal is elastomeric and the point of contact is minimized. The relief valve further includes an outlet port, which is adjustable 360° about the relief valve.

8 Claims, 2 Drawing Sheets

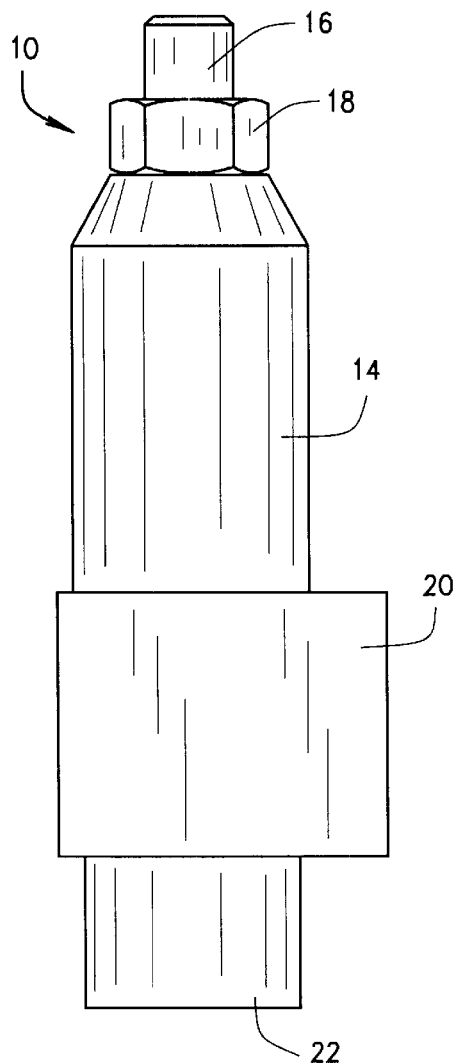
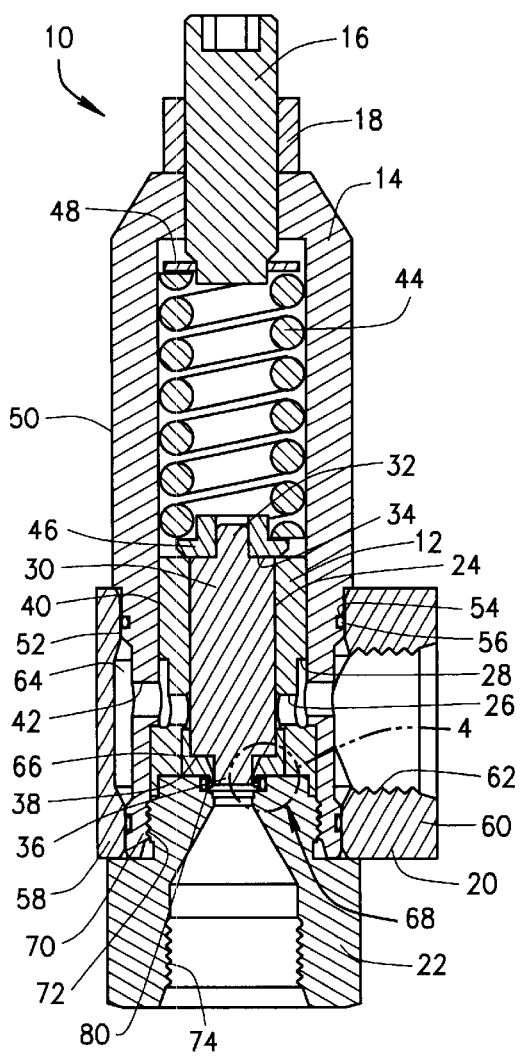
FIG. 1
FIG. 2

LOW BLOW DOWN RELIEF VALVE

BACKGROUND OF THE INVENTION

1. Field of the Invention

The present invention relates to a pressure relief valve and more particularly to a pressure relief valve having a reduced blow down pressure of about 5% or less and further having an outlet port which is adjustable 360° about the relief valve. The relief valve also has a pressure energized seal.

2. Description of the Prior Art

Relief valves are placed in piping systems, pressure vessels and other systems to vent excess pressure from the system in an attempt to prevent damage to the system without endangering the workers or environment. In a relief valve, the pressure at which the valve opens, known as the set pressure, is a function of the spring rate and the initial friction of the seals. The pressure at which the valve closes is also dependent on the set pressure and the stick friction of the seals. Typically, the larger the stick friction component, the lower the system pressure must fall to allow the relief valve to close. The amount the pressure must fall below the set point to allow the relief valve to close is called "blow down".

Blow down is typically expressed as a percentage of the set point (also known as set pressure). For example, if the set point is 4,000 psi, and the blow down dead band is 20%, the pressure within the system must fall to approximately 3,200 psi before the relief valve will close and reseat. High blow down in this type of relief valve is undesirable.

Prior art relief valves typically have a blow down of approximately 15–30%. For example, if the set pressure is 4,000 psi, the pressure must drop to 2800 to 3400 psi before the opened valve reseats. The 1200–600 psi pressure drop represents 30–15% of the set pressure.

Various types of relief valves are known in the art such as those disclosed in the following U.S. Pat. Nos.: 5,168,895; 4,790,348; 4,530,373; 4,313,463; 4,284,101 and 3,232,314. Copies of these patents are included in the Information Disclosure Statement filed concurrently herewith.

A commercially successful relief valve is the subject of U.S. Pat. No. 4,456,028 issued in 1984 and assigned to Gilmore Valve Co., the assignee of the present invention. In order for this relief valve to close, a metal seal disk must slide across a metal sealing surface into sealing engagement with the valve outlet bore. This metal to metal sealing assembly causes friction, resulting in a blow down of approximately 20%. It would be desirable from a systems standpoint to reduce the blow down of the relief valve.

Prior art relief valves further typically include a predetermined outlet port position. At best, the position of the prior art outlets could be changed by disassembly and reconstruction of the valve. A relief valve having an outlet port that is easily and variably positioned without disassembling the valve is desirable. Such a valve is user friendly and easy to install. The present invention has an outlet port that is adjustable 360° about the relief valve.

SUMMARY OF THE INVENTION

A relief valve is disclosed that performs with blow down values of about 5% or less. This is accomplished by reducing the friction experienced by the relief valve during closing. The relief valve includes a body which houses a plunger that comes into sealing contact with the valve inlet. Clearance is provided between the body and the plunger, thereby eliminating friction on the plunger as it moves into sealing contact with the seal assembly. An energized seal assembly forms a tight seal against the plunger while creating little friction.

The relief valve further includes an outlet port, which is adjustable 360° about the valve. An adapter block that defines the relief valve outlet port includes an annular portion that surrounds and is freely rotatable about the valve and a projecting portion that defines the valve outlet port. The adapter block rotates upon o-rings that create a seal as well as providing a sliding surface for the adapter block. The adjustable position outlet port greatly improves the ease of installation of the relief valve.

BRIEF DESCRIPTION OF THE DRAWINGS

FIG. 1 is a perspective view of the low blow down relief valve of the present invention.

FIG. 2 is a cross sectional view of the low blow down relief valve of FIG. 1 with the valve in the closed position.

DETAILED DESCRIPTION

Figures 3, 4:
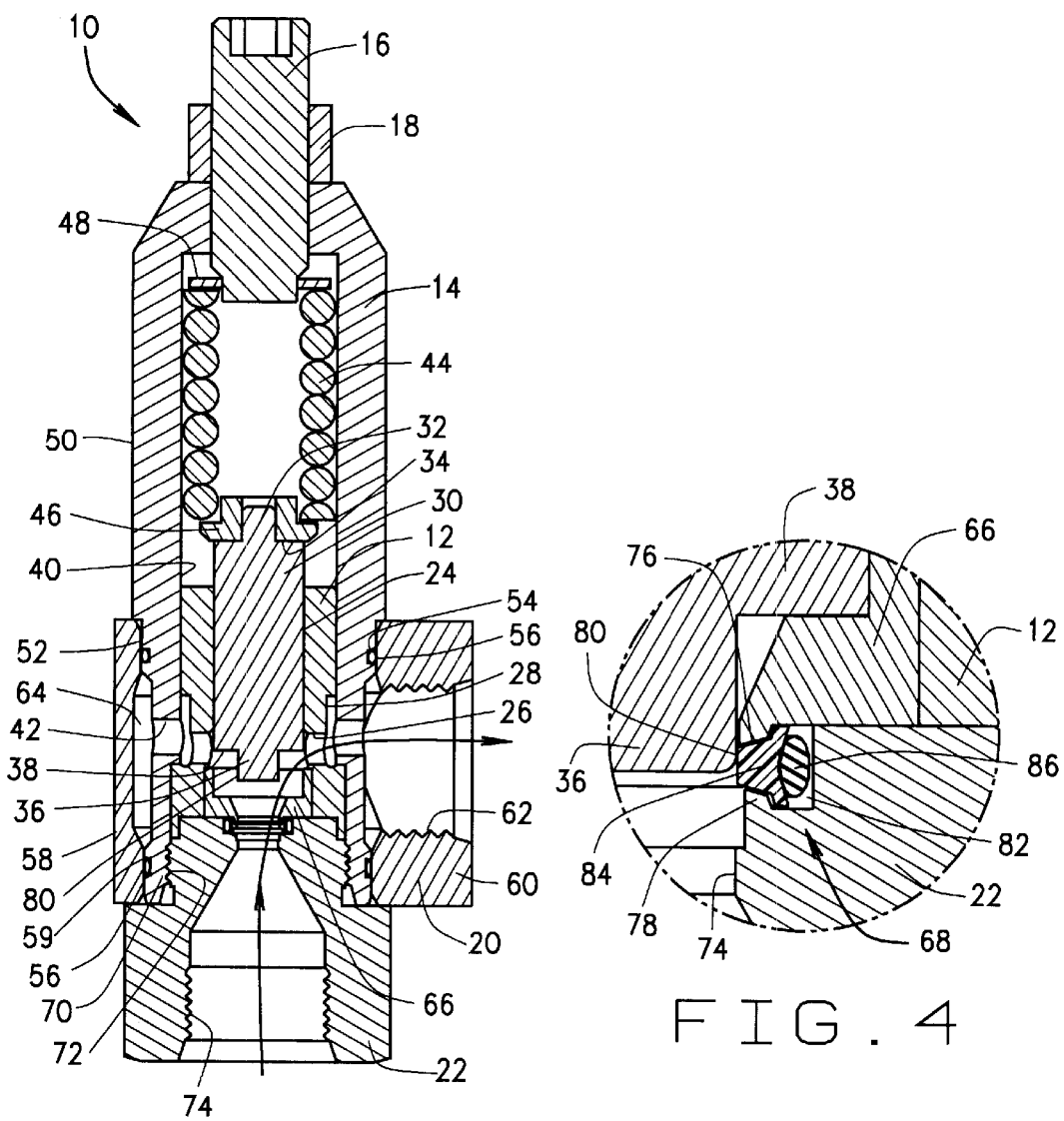
FIG. 3 is a cross sectional view of the low blow down relief valve of FIG. 1 with the valve in the open position.
FIG. 4 is an enlarged cross sectional view of the seal assembly of FIG. 2. The seal assembly is shown in the valve closed position of FIG. 2.

Referring now to FIG. 1, a pressure relief valve is generally designated 10. The relief valve 10 includes a valve bonnet 14, an adjusting screw 16, a locking nut 18 to secure adjusting screw 16 in place, an adapter block 20 and a valve cap 22. The interrelation of these components is illustrated more clearly in the cross sectional view of FIG. 2.

As seen in FIG. 2, the relief valve 10 includes a body 12 having a central bore 24. The body 12 includes at least one transverse bore 26, and an annular channel 28 that are in fluid communication with the central bore 24.

The central bore 24 houses a plunger 30 that moves axially within the central bore 24 of body 12. The plunger includes a first reduced diameter portion 32 defining a first plunger shoulder 34, and a second reduced diameter portion 36 defining a second plunger shoulder 38. The plunger 30 and the central bore 24 are sized so as to create a clearance between the plunger 30 and body 24, thereby eliminating friction between the plunger 30 and central bore 24 when the plunger 30 moves within the central bore 24.

The valve bonnet 14 has a central bore 40, and at least one transverse bore 42. Transverse bore 42 is in fluid communication with the transverse bore 26 and annular channel 28 of body 12. The bonnet 14 houses body 12 and plunger 30 within bonnet central bore 40. The bonnet further houses a compression spring 44 that engages the first plunger shoulder 34 through a spring disk 46.

Those skilled in the art will recognize that in order to achieve different set pressure ranges for the relief valve 10, springs with different degrees of flexibility, typically expressed as spring rate in pounds per inch, may be used. The following set pressures/spring rates are for a ½ inch relief valve 10. These examples are given for illustrative purposes only and are not meant to be limiting in any way.

| Set Pressure | Spring Rate |
|---|---|
| 150–500 psi | 60 lb./in. |
| 450–2,000 psi | 250 lb./in. |
| 1,800–3,500 psi | 400 lb./in. |
| 3,500–5,500 psi | 950 lb./in. |
| 5,000–6,000 psi | 2,000 lb./in. |

At higher-pressure ranges, it may be necessary to use a first spring 44 and a second spring, not shown. The springs are nested one inside the other. However, for lower pressure ranges, a single spring 44 will suffice.

The spring 44 is captured between an adjusting screw 16 and the spring disk 46 through a washer 48. The adjusting screw 16 threadably engages the valve bonnet 14. Rotation of the adjusting screw 16 compresses or relaxes the tension in the spring 44, thereby increasing or decreasing the set point of the relief valve 10. The adjusting screw 16 is held in place by tightening lock nut 18 against bonnet 14.

The exterior surface 50 of bonnet 14 includes a reduced diameter segment 52 sized to accept the adjusting block 20. The reduced diameter segment 52 includes o-ring channels 54 housing o-rings 56. The adjusting block 20 includes an annular portion 58 which surrounds the reduced diameter segment 52 of bonnet 14, and is freely rotatable upon o-rings 56. The o-rings 56 also create a seal between the adjusting block 20 annular portion 58 and the bonnet 14.

The adjusting block 20 further includes a projecting portion 60 that defines valve outlet port 62. The rotation of the annular portion 58 about the bonnet 14 determines the location of the outlet port 62 relative the relief valve 10. The valve outlet port 62 is preferably threaded to facilitate connection to downstream piping.

The adjusting block annular portion 58 and the bonnet 14 form a channel 64 that is in fluid communication with the bonnet transverse bore 42, the body annular channel 28, the body transverse bore 26, the body central bore 24 and the outlet port 62.

When in the valve closed position, the plunger second shoulder 38 is engaged by a retainer 66 that limits the movement of the plunger 30 within the central bore 24. The adjusting block 20, body 12, plunger 30 and spring 44 are secured in place by the valve cap 22. The valve cap 22 includes threads 72 that engage the bonnet 14 at bonnet threads 70.

The valve cap 22 defines the inlet port 74 that may be threaded to facilitate connection to exterior piping and a pressurized fluid source, not shown. The valve cap 22 further includes a sealing assembly generally designated 68.

Relief valve 10 is shown in the closed position in FIG. 2. The spring 44 urges a sealing surface 80 of the second reduced diameter portion 36 of plunger 30 into sealing contact with the seal assembly 68 of the valve cap 22. The seal assembly 68 creates a seal between the plunger 30 and the inlet port 74 to prevent fluid from flowing from the inlet port 74 to the outlet port 62.

FIG. 3 illustrates the relief valve in the open position. When the pressure from the pressurized fluid source (not shown) exceeds the set point of the spring 44, the pressure exerts a lifting force on the plunger 30 to compress the spring 44. As the plunger 30 disengages the seal assembly 68, fluid flows from the inlet port 74 to the outlet port 62 through the body central bore 24, the body transverse bore 26, the body annular channel 26, the body transverse bore 42 and the channel 64.

As the pressure dissipates below the spring set point, the spring 44 urges the plunger 30 towards the inlet port 74. Due to the clearance between the body 12 and the plunger 30, the plunger 30 does not experience significant friction as it moves into the valve closed position of FIG. 2. The only friction experienced is as the plunger 30 sealing surface 80 just touches or 'kisses' the seal assembly 68. The use of an elastomeric seal, as opposed to the metal to metal seal of the prior art, as well as the minimization of the sealing contact reduces the friction created during valve reseat and closing. This reduction in friction reduces the blow down, resulting in blow down values of 5% or lower.

The seal assembly 68, also known as an energized seal, is seen in more detail in FIG. 4. The retainer 66 includes a lip projection 76 that in combination with a lip projection 78 of the valve cap 22 creates a seal assembly cavity 82 between the retainer 66 and the valve cap 22. Housed in the seal assembly cavity 82 are a wedge shaped seal 84 and an o-ring 86. The wedge shaped seal 84 needs to be relatively stiff and can be formed from Delrin® or other suitable materials. The o-ring 86 can be formed from typical elastomers such as bung-N. The o-ring 86 must be capable of being deformed under operational pressure. The seals 84,86 are held in position within the assembly cavity 82 by the protruding lips 76,78. As the sealing surface 80 of the plunger 30 comes into contact with the wedge seal 84, pressure exerted on the o-ring 86 squeezes the o-ring 86 causing it to exert lateral force against the wedge shaped seal 84. This forces the wedge seal 84 toward the plunger sealing surface 80 creating a tight seal with minimum friction causing contact. The seal assembly 68 is sometimes referred to as an "energized seal" in the industry.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A relief valve connected to a pressurized fluid source to relieve excess pressure, the valve comprising:

a body having a central bore and at least one transverse bore, the central bore housing a plunger, the central bore being of a diameter to allow the plunger to slide without friction within the central bore, the plunger having a valve open position and a valve closed position;

a valve bonnet having a central bore defining a housing for the valve body and a spring, the spring being in contact with the plunger, the housing adapted to threadably engage an adjusting screw so that a set point for the relief valve can be adjusted by rotation of the adjusting screw, the valve bonnet further including at least one transverse bore in fluid communication with the body transverse bore;

an adapter block defining a valve outlet port, the outlet port being in fluid communication with the valve bonnet transverse bore; and a valve cap having a central bore defining a valve inlet port connected to the pressurized fluid source, the valve cap central bore including a sealing assembly, the valve cap threadably engaging the valve bonnet to secure the body, plunger and spring within the bonnet central bore;

whereby upon pressure from the fluid source exceeding the set point the plunger is forced into the valve open position allowing fluid to flow from the inlet port to the outlet port, and upon a decrease in pressure below the set point the spring urges the plunger into the valve closed position wherein the plunger is in sealing contact with the sealing assembly, the plunger experiencing friction only at the point of contact with the sealing assembly.

2. The relief valve of claim 1 wherein the sealing assembly comprises a channel having a wedge shaped seal and an o-ring seal therein, whereby pressure to the sealing assembly forces the o-ring against the wedge shaped seal to secure the wedge shaped seal into sealing contact with the plunger when the plunger is in the valve closed position.

3. The relief valve of claim 1 wherein the adapter block is rotatable 360° about the body and the bonnet to allow positioning of the outlet port.

4. A relief valve connected to a pressurized fluid source to relieve excess pressure, the valve comprising:

a body having a central bore and at least one transverse bore, the central bore housing a plunger, the central bore being of a diameter to allow the plunger to slide without friction within the central bore, the plunger having a valve open position and a valve closed position;

a valve bonnet having a central bore defining a housing for the valve body and a spring, the spring being in contact with the plunger, the housing adapted to threadably engage an adjusting screw so that a set point for the relief valve can be adjusted by rotation of the adjusting screw, the valve bonnet further including at least one transverse bore in fluid communication with the body transverse bore;

an adapter block defining a valve outlet port, the outlet port being in fluid communication with the valve bonnet transverse bore; and a valve cap having a central bore defining a valve inlet port connected to the pressurized fluid source, the valve cap threadably engaging the valve bonnet to secure the body, plunger and spring within the bonnet central bore;

the valve cap including a sealing assembly comprised of a channel having a wedge shaped seal and an o-ring seal, the pressure from the pressurized fluid source forcing the o-ring against the wedge shaped seal urging the wedge shaped seal into sealing contact with the plunger when the plunger is in the valve closed position;

whereby upon pressure from the fluid source exceeding the set point the plunger is forced into the valve open position allowing fluid to flow from the inlet port to the outlet port, and upon a decrease in pressure below the set point the spring urges the plunger into the valve closed position wherein the plunger in sealing contact with the sealing assembly, the plunger experiencing friction only at the point of contact with the sealing assembly, thereby reducing the reseat pressure to less than 5% of the set pressure.

5. The relief valve of claim 4 wherein the adapter block is rotatable 360° about the body and the bonnet to allow positioning of the outlet port.

6. A relief valve connected to a pressurized fluid source to relieve excess pressure, the valve comprising:

a body having a central bore and at least one transverse bore, the central bore housing a plunger, the central bore being of a diameter to allow the plunger to slide without friction within the central bore, the plunger having a valve open position and a valve closed position;

a valve bonnet having a central bore defining a housing for the valve body and a spring, the spring being in contact with the plunger, the housing adapted to threadably engage an adjusting screw so that a set point for the relief valve can be adjusted by rotation of the adjusting screw, the valve bonnet further including at least one transverse bore in fluid communication with the body transverse bore;

an adapter block defining a valve outlet port, the outlet port being in fluid communication with the valve bonnet transverse bore, the adapter block being rotatable 360° about the body and bonnet to facilitate positioning of the outlet port; and a valve cap having a central bore defining a valve inlet port connected to the pressurized fluid source, the valve cap central bore including a sealing assembly, the valve cap threadably engaging the valve bonnet to secure the body, plunger and spring within the bonnet central bore;

whereby upon pressure from the fluid source exceeding the set point the plunger is forced into the valve open position allowing fluid to flow from the inlet port to the outlet port, and upon a decrease in pressure below the set point the spring urges the plunger into the valve closed position wherein the plunger in sealing contact with the sealing assembly, the plunger experiencing friction only at the point of contact with the sealing assembly.

7. The relief valve of claim 6 wherein the adapter block includes an annular portion that is secured within and is rotatable about a channel formed by a recessed segment in the valve bonnet, the recessed bonnet segment including at least two annular channels housing o-rings upon which the adapter block rotates, the adapter block further including a projecting portion defining the outlet port, the adapter block being secured in position by the valve cap.

8. A relief valve connected to a pressurized fluid source to relieve excess pressure, the valve comprising:

a body having a central bore and at least one transverse bore, the central bore housing a plunger, the central bore being of a diameter to allow the plunger to slide without friction within the central bore, the plunger having a valve open position and a valve closed position;

a valve bonnet having a central bore defining a housing for the valve body and a spring, the spring being in contact with the plunger, the housing adapted to threadably engage an adjusting screw so that a set point for the relief valve can be adjusted by rotation of the adjusting screw, the valve bonnet including a recessed portion having at least two channels housing o-rings, the valve bonnet further including a transverse bore in fluid communication with the body transverse bore;

an adapter block having an annular portion that is secured within and is rotatable about the recessed portion of the valve bonnet upon the valve bonnet o-rings, the adapter block further including a projecting portion defining the outlet port; and a valve cap defining a valve inlet port connected to the pressurized fluid source, the valve cap threadably engaging the valve bonnet to secure the body, plunger and spring within the bonnet central bore, and to secure the annular portion of the adapter block within the recessed segment of the valve bonnet;

the valve cap central bore including a sealing assembly comprised of a channel having a wedge shaped seal and an o-ring seal therein, the pressure from the pressurized fluid source forcing the o-ring against the wedge shaped seal to secure the wedge shaped seal into sealing contact with the plunger when the plunger is in the valve closed position whereby upon pressure from the fluid source exceeding the set point the plunger is forced into the valve open position allowing fluid to flow from the inlet port to the outlet port, and upon a decrease in pressure below the set point the spring urges the plunger into the valve closed position wherein the plunger in sealing contact with the sealing assembly, the plunger experiencing friction only at the point of contact with the sealing assembly, thereby reducing the blowdown pressure.

* * * * *